United States Patent
Chang et al.

(10) Patent No.: US 7,747,080 B2
(45) Date of Patent: Jun. 29, 2010

(54) SYSTEM AND METHOD FOR SCANNING EDGES OF A WORKPIECE

(75) Inventors: Chih-Kuang Chang, Taipei Hsien (TW); Xiao-Chao Sun, Shenzhen (CN); Li Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 842 days.

(21) Appl. No.: 11/616,871

(22) Filed: Dec. 28, 2006

(65) Prior Publication Data

US 2008/0037874 A1    Feb. 14, 2008

(30) Foreign Application Priority Data

Aug. 9, 2006   (CN) ..................... 2006 1 0062038

(51) Int. Cl.
*G06K 9/48*    (2006.01)
*G06K 9/00*    (2006.01)
*G06K 9/46*    (2006.01)

(52) U.S. Cl. .................. 382/199; 382/152; 382/197; 382/203

(58) Field of Classification Search .......... 382/152, 382/197, 199, 203
See application file for complete search history.

(56) References Cited

U.S. PATENT DOCUMENTS

| | | | | |
|---|---|---|---|---|
| 6,393,159 | B1 * | 5/2002 | Prasad et al. | 382/259 |
| 6,694,057 | B1 * | 2/2004 | Miller et al. | 382/203 |
| 6,900,801 | B2 | 5/2005 | Lee | |
| 2002/0025073 | A1 * | 2/2002 | Shibuya | 382/199 |

* cited by examiner

*Primary Examiner*—Vikkram Bali
*Assistant Examiner*—Soo Jin Park
(74) *Attorney, Agent, or Firm*—Wei Te Chung

(57) ABSTRACT

An exemplary method for edge scan of an image is provided. The method includes: setting parameters of an image edge scan; setting parameters for scanning edges of the workpiece; obtaining an image of the workpiece; processing the image and designating a point in the image; searching a first edge point near the designated point in a clockwise direction, wherein there is at least one point adjacent to the first edge point whose color is different with the color of the first edge point; searching other edge points in the manner of searching the first edge point by utilizing a recursive method; calculating coordinates of initial points and end points of scan lines according to the parameters, and searching scanned points according to the initial points and end points on the image that has not been processed; scanning edges of the image based on the scanned points. A related system is also provided.

11 Claims, 9 Drawing Sheets

SYSTEM AND METHOD FOR SCANNING EDGES OF A WORKPIECE

BACKGROUND OF THE INVENTION

1. Field of the Invention

The present invention relates to a system and method for scanning edges of a workpiece.

2. Description of Related Art

Measurement is an important phase in the production process. It is closely interrelated to the quality of the production. In ordinary measurement technology, some people use a charge coupled device (CCD) or a contact-measure method to measure ball grid array (BGA) objects and three-dimensional objects. Some other people use an image measure machine within a CCD to measure the BGA objects and the three-dimensional objects, and convert images captured by the CCD into data files. If actual sizes of the objects are very small, the images captured by the CCD should larger than the actual sizes of the objects in order to insure the measurement precision of the objects.

When the image measure machine measures a workpiece, the CCD captures images of the workpiece firstly, and then a user edits a program to scan the images of the workpiece. The CCD has a focusing, which has a fixed capture spectrum, can only capture images limited to part of the workpiece. If the user wants to scan an overview image of the whole workpiece in one plane, the program is required to be edited preliminarily, and there may be some errors in editing the program.

What is needed, therefore, is a system and method for scanning edges of the workpiece automatically in the plane.

SUMMARY OF THE INVENTION

A system for scanning edges of a workpiece is disclosed. The system includes an image measuring machine and a computer. The image measuring machine includes a charge coupled device (CCD), a work platform is configured with the workpiece ready to be scanned, and three motors. The computer includes a parameter setting unit, a motion control adapter card, an image adapter card, an image obtaining unit, an image process unit, an edge extracting unit, an image edge scan unit, a detecting unit and a calculating unit. The parameter setting unit is configured for setting parameters of scanning edges of the workpiece. The motion control adapter card is connected with the motors, and configured for controlling movements of the motors to locate the work platform and focus the CCD on the workpiece. The image adapter card is connected with the CCD, and configured for collecting at least one image of the workpiece captured by the CCD. The image obtaining unit is configured for obtaining an image from the image adapter card if the CCD captures the workpiece. The image processing unit is configured for executing an image sharpness process and an image binarization process in order that the background color of the image is opposite to the color of the workpiece on the image. The edge extracting unit is configured for searching a first edge point near a designated point in the image in a clockwise direction, wherein there is at least one point adjacent to the first edge point whose color is different with the color of the first edge point, and configured for searching other edge points of the image along with the manner of searching the first edge point by utilizing a recursive method, and extracting an outline of the image based on the searched edge points. The image edge scan unit is configured for calculating normal vectors and tangent vectors for each edge point on the outline, calculating coordinates of initial points and end points of scan lines according to the corresponding normal vectors and the parameters, and searching scanned points on the image that has not been processed accurately according to the initial points and end points, and scanning the edges of the workpiece based on the scanned points. The detecting unit is configured for detecting whether each of the scanned points is within the image, and detecting whether all the scanned points collectively form a closed edge path of the workpiece. The calculating unit is configured for calculating a move distance of the work platform and determining the move direction of the work platform according to the tangent vectors, in order to capture a next image of the workpiece if any scanned point is not within the image or if all the scanned points collectively form an open edge path.

A method for scanning edges of an image is disclosed. The method includes: setting parameters for scanning edges of the workpiece; obtaining an image of the workpiece ready to be scanned; processing the image and designating a point in the image; searching a first edge point near the designated point in the image in a clockwise direction, wherein there is at least one point adjacent to the first edge point whose color is different with the color of the first edge point; searching other edge points in the manner of searching the first edge point by utilizing a recursive method; calculating coordinates of initial points and end points of scan lines according to the parameters, and searching scanned points according to the initial points and end points on the image that has not been processed; scanning edges of the image based on the scanned points; detecting whether the scanned points are within the image; calculating a move distance of the work platform and determining the move direction of the work platform to capture a next image of the workpiece if any scanned point is not within the image, and controlling the motors to move the work platform; detecting whether all the scanned points collectively form a closed edge path of the image if the scanned points are within the image; and returning to the step of calculating the move distance of the work platform if the scanned points collectively form an open edge path.

Other systems, methods, features, and advantages of the present invention will be or become apparent to one with skill in the art upon examination of the following drawings and detailed description.

DETAILED DESCRIPTION OF THE INVENTION

Figure 1:
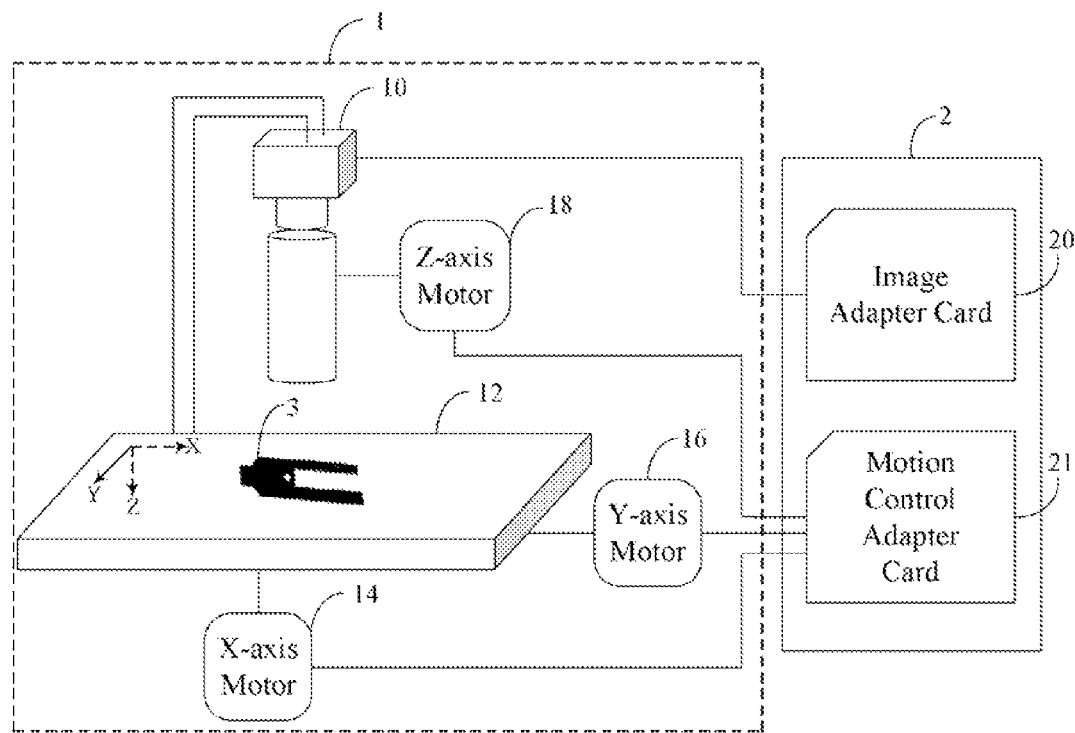
FIG. 1 is a schematic diagram illustrating an application environment of a system for scanning edges of a workpiece in accordance with one embodiment.

FIG. 1 is a schematic diagram illustrating an application environment of a system for scanning edges of a workpiece (hereinafter, "the system"), in accordance with one preferred embodiment. The system is implemented with a computer 2. The computer 2 connects with an image measuring machine 1 that is configured for scanning at least one workpiece 3. The image measuring machine 1 typically includes a charge coupled device (CCD) 10, a work platform 12, an x-axis motor 14, a y-axis motor 16, and a z-axis motor 18. The computer 2 typically includes an image adaptor card 20 and a motion control adaptor card 21.

The CCD 10 is connected with the image adapter card 20, and mainly includes a focusing which has a fixed capture spectrum. The CCD 10 is configured for capturing images of the workpiece 3 by utilizing the focusing. If the fixed capture spectrum is less than a size of the workpiece 3, the work platform 12 needs to be moved by the x-axis motor 14 and the y-axis motor 16 that are driven by the motion control adapter card 21, so that the CCD 10 can capture other parts of the workpiece 3 horizontally. The z-axis motor 18 is configured for controlling the CCD 10 to move in vertical direction. For example, the z-axis motor 18 controls the focusing to focus on the workpiece 3.

Figure 2:
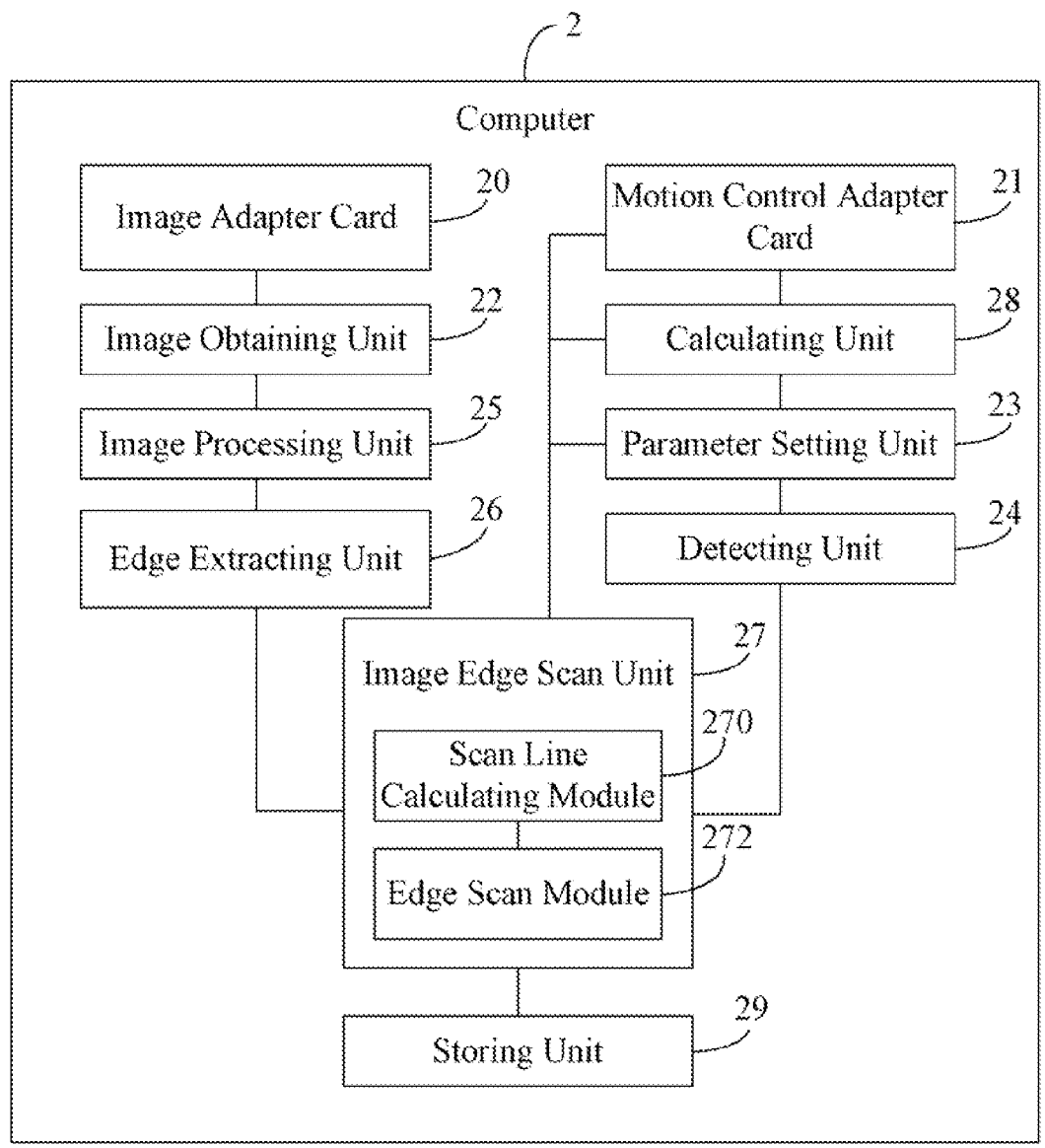
FIG. 2 is a schematic diagram of software function units of the computer of FIG. 1.

FIG. 2 is a schematic diagram of software function units of the computer 2 of FIG. 1. Besides the image adapter card 20 and the motion control adaptor card 21, the computer 2 further includes an image obtaining unit 22, a parameter setting unit 23, a detecting unit 24, an image processing unit 25, an edge extracting unit 26, an image edge scan unit 27, a calculating unit 28, and a storing unit 29.

Figure 3:
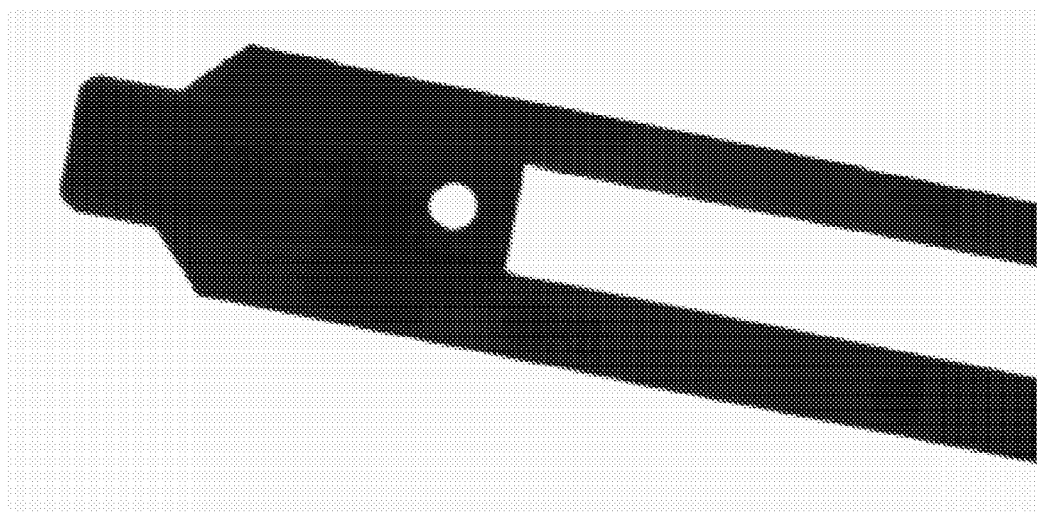
FIG. 3 is a schematic diagram of an obtained image.
Figure 5:
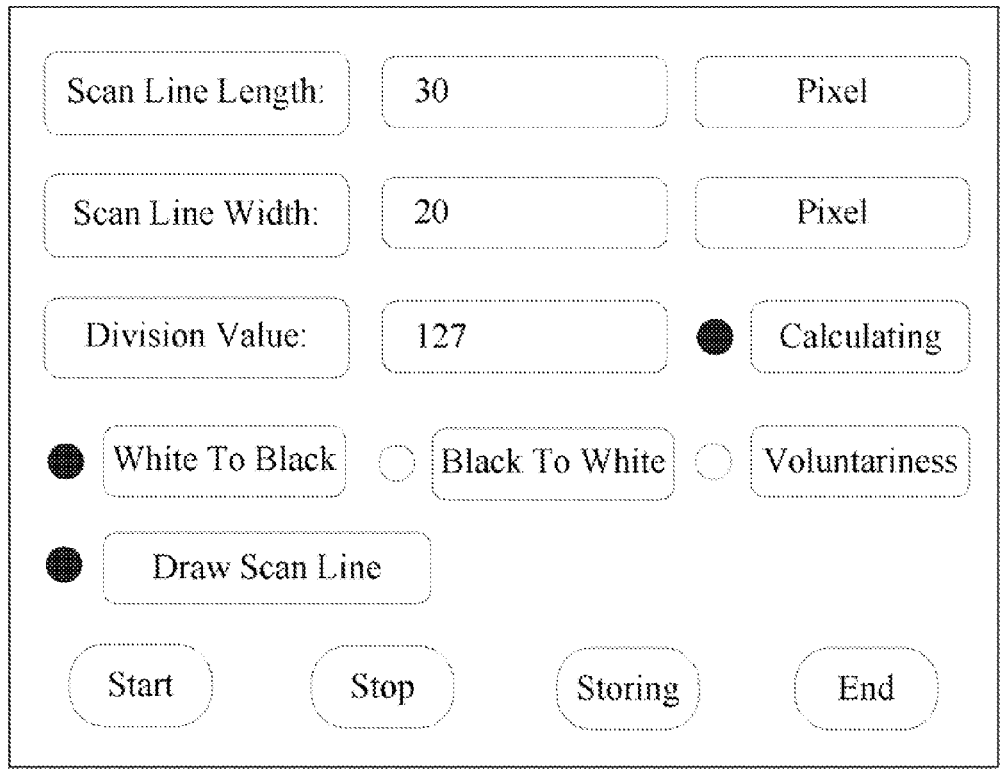
FIG. 5 is a dialog box of setting parameters of the system in FIG. 1.

The image obtaining unit 22 is configured for obtaining the image of the workpiece 3 from the image adapter card 20 when the CCD 10 captures the workpiece 3, FIG. 3 is a schematic diagram of an obtained image. The parameter setting unit 23 is configured for prompting a dialog box for configuring parameters used for scanning edges of the workpiece 3 as shown in FIG. 5. The parameters include a scan line length, a scan line width, a division value of an image binarization process, and a draw line parameter for determining whether to draw scan lines. The detecting unit 24 is configured for detecting whether the parameters are valid. For example, if the detecting unit 24 detects that the scan line length is a negative value, the scan line length is invalid. The detecting unit 24 is further configured for prompting errors of the parameters if any parameters are invalid.

Figure 4:
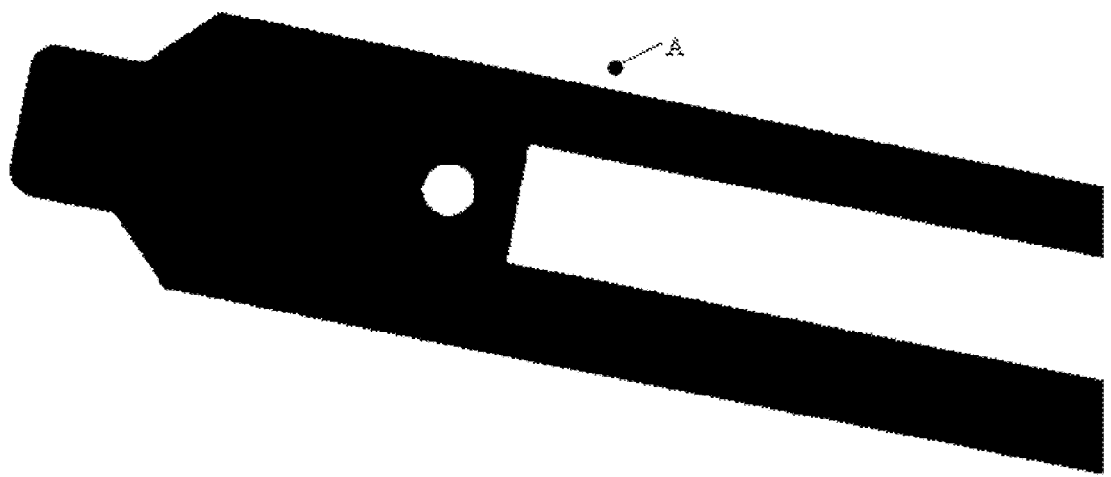
FIG. 4 is a schematic diagram of a processed image.

The image processing unit 25 is configured for calculating the division value of the obtained image, and executing an image sharpness process and the image binarization process based on the division value. An example of a schematic diagram of the processed image is depicted in FIG. 4. That is, the image processing unit 25 totals all of the gray scales of pixels of the obtained image and outputs a summation. The summation, divided by a total number of the pixels is the division value. The division value can be designated, or calculated by the image processing unit 25 automatically. The processed image is clearer than the obtained image. The background color of the processed image is opposite to the color of the workpiece 3 on the processed image. In the preferred embodiment, the background color of the processed image is white, and the color of the workpiece 3 is black.

The edge extracting unit 26 is configured for extracting an outline of the processed image according to a designated point(see point "A" in FIG. 4). If the designated point is not an edge point (for example, the color of the designated point is white, and colors of the points adjacent to the designated point are white), the edge extracting unit 26 searches a first edge point near the designated point in the processed image in a clockwise direction. There is at least one point adjacent to the first edge point whose color is different with the first edge point. If the designated point is one edge point, for example, the color of the designated point is black, and there is at least one white point adjacent to the designated point, the edge extracting unit 26 is further configured for searching other edge points of the processed image in the manner of searching the first edge point by utilizing a recursive method, and for extracting an outline of the processed image based on the edge points.

Figure 7:
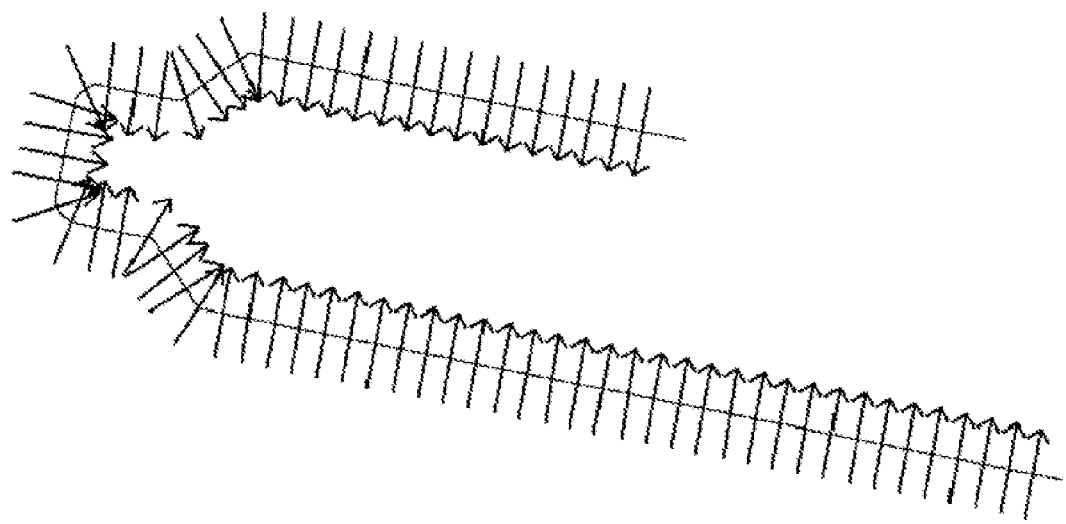
FIG. 7 is a schematic diagram of scanning edges of the workpiece of FIG. 4.

The image edge scan unit 27 is configured for calculating a normal vector and a tangent vector of each of the edge points, calculating coordinates of an initial point and an end point of each of the scan lines according to the parameters and the normal vector, searching all the edge points accurately as scanned points according to the scan lines, and scanning the edges of the workpiece 3 based on the scanned points. FIG. 7 is a schematic diagram of scanning edges of the workpiece 3. The image edge scan unit 27 includes a scan line calculating module 270, and an edge scan module 272.

The scan line calculating module 270 is configured for calculating the normal vector and the tangent vector for each of the edge points, calculating coordinates of an initial point and an end point of each of the scan line according to the scan line length and the normal vector of the edge point. In the preferred embodiment, the image of the workpiece 3 is two-dimensional and mapped with the x-axis and y-axis, the user can set an edge point collection $P_i (X_i, Y_i)$ (i=1~N), sets a linear equation "y=ax+b", and obtains an objective function by utilizing a least square method. The objective function is $$F(a, b) = \sum_{i=1}^{N} (y_i - ax_i - b)^2.$$

If the user obtains a minimum value of the objective function, $$\frac{\partial F}{\partial a} = 0, \frac{\partial F}{\partial b} = 0,$$

the user solves the two functions, and obtains two parameters:

$$a = \frac{N \sum_{i=1}^{N} x_i y_i - \sum_{i=1}^{N} x_i \sum_{i=1}^{N} y_i}{N \sum_{i=1}^{N} x_i^2 - \left(\sum_{i=1}^{N} x_i\right)^2}$$

$$b = \frac{\sum_{i=1}^{N} x_i^2 \sum_{i=1}^{N} y_i - \sum_{i=1}^{N} x_i \sum_{i=1}^{N} x_i y_i}{N \sum_{i=1}^{N} x_i^2 - \left(\sum_{i=1}^{N} x_i\right)^2},$$

if the linear equation "y=ax+b" covers the point (0, b, 0), the user can obtain a unit vector (l, m, n) of the tangent vector, $$\left.\begin{array}{l} l = \dfrac{1}{\sqrt{1+a^2}} \\ m = \dfrac{a}{\sqrt{1+a^2}} \\ n = 0 \end{array}\right\},$$

a unit vector (I, J, K) of the normal vector, $$\left.\begin{array}{l} I = -m = -\dfrac{a}{\sqrt{1+a^2}} \\ J = n = \dfrac{1}{\sqrt{1+a^2}} \\ K = 0 \end{array}\right\}.$$

For example, each pixel has a fixed size, if a pixel is between any two edge points, the scan line calculating module 270 calculates coordinates of the initial point and end point of the scan line.

Figure 6:
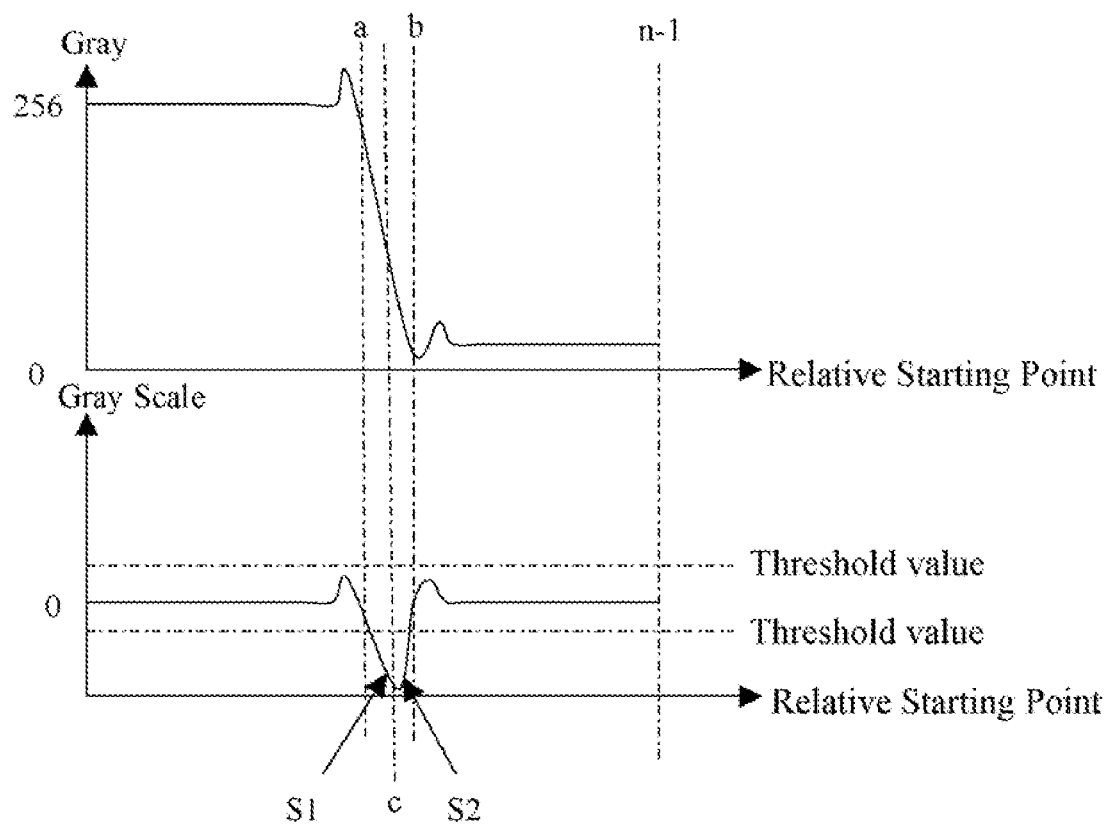
FIG. 6 is a schematic graph of searching a scanned point.

Although the edge extracting unit 26 searches the other edge points on the outline of the processed image by utilizing the recursive method, there may be some errors. Therefore, the edge scan module 272 needs to search the edge points accurately as scanned points according to the initial points and the end points, and scan the edges of the workpiece 3 based on the scanned points. For example, if the parameter for drawing scan lines is set, the scan line calculating module 270 draws the scan lines in the obtained image (see in FIG. 7). Each point of corresponding scan line has a gray vale, and all the points of the scan line compose gray scales. The scan line calculating module 270 finds two gray scales (see point "a" and "b" in FIG. 6) whose values have a great difference, and finds a point "c" which can divide two same areas (see "S1" and "S2") as seen in FIG. 6. Point "c" is one scan point found.

The detecting unit 24 is further configured for detecting whether each of the scanned points is within the obtained image, and for detecting whether all the scanned points collectively form a closed edge path.

If any of the scanned points is not within the obtained image or all of the scanned points collectively form an open edge path, the edge scan module 272 prompts a message that the work platform 12 needs to be moved with the x-axis motor 14 and the y-axis motor 16 via the motion control adapter card 21.

The calculating unit 28 is configured for calculating a move distance of the work platform 12 and determining the move direction of the work platform 12. The CCD 10 captures other parts of the workpiece 3 according to the move distance and move direction. In the preferred embodiment, the move distance of the work platform 12 is half of the capture spectrum of the CCD 10. For example, if a pixel size is 0.02 millimeters, the capture spectrum of the CCD 10 is 640*480 pixels, the move distance of the work platform 12 is 320*240 pixels, namely, the work platform 12 moves 320*0.02 millimeters in the x-axis and moves 240*0.02 millimeters in the y-axis. The move direction of the work platform 12 is determined according to the tangent vector.

The storing unit 29 is configured for storing coordinates of all the scanned points in a file of the computer 2.

Figure 8:
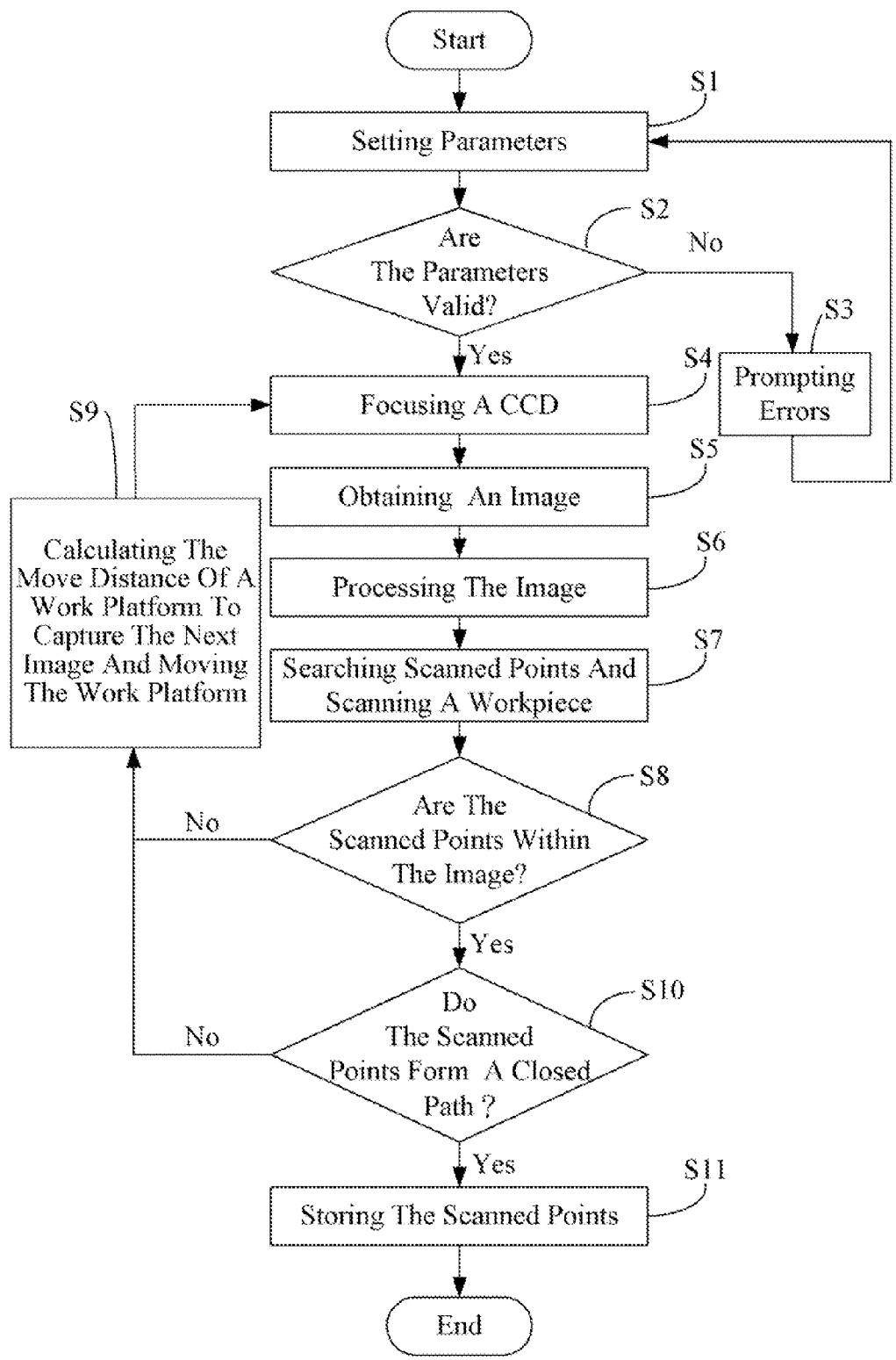
FIG. 8 is a flowchart of a preferred method for scanning edges of a workpiece in accordance with another embodiment.

FIG. 8 is a flowchart of a preferred method for scanning the edges of the workpiece 3 in accordance with another embodiment. In step S1, the parameter setting unit 23 prompts the dialog box for configuring parameters used for scanning edges of the workpiece 3. The parameters include the scan line length, the scan line width, the dividing value of the image binarization process, and the draw line parameter for determining whether to draw scan lines. In the preferred embodiment, the scan line length is less than eighty pixels, and the scan line width is less than one hundred pixels. For example, the scan line length is thirty pixels, and the scan line width is twenty pixels.

In step S2, the detecting unit 24 detects whether the parameters are valid. For example, if the scan line length has a negative value, it is invalid.

In step S3, if any of the parameters are invalid, the detecting unit 24 prompts the user, and the procedure returns to step S1.

In step S4, if the parameters are valid, the motion control adapter card 21 controls the movement of the z-axis motor 18, and the CCD 10 focuses on the workpiece 3.

In step S5, the image obtaining unit 22 obtains the image of the workpiece 3 from the image adapter card 20 in the capture spectrum when the CCD 10 captures the workpiece 3.

In step S6, the image processing unit 25 calculates the division value of the obtained image, and processes the obtained image based on the division value. The image process includes the image sharpness process and the image binarization process.

In step S7, the user designates a point in the processed image, the edge extracting unit 26 searches the edge point that is adjacent to the designated point in the clockwise direction or the counter-clockwise direction, and searches the other edge points by utilizing the recursive method, the image edge scan unit 27 searches all the edge points accurately in FIG. 3 as scanned points according to the scan line length, and scans the edges of the workpiece 3 based on the scanned points.

In step S8, the detecting unit 24 detects whether all the scanned points are within the obtained image.

If any scanned point is not within the obtained image, in step S9, the calculating unit 28 calculates the move distance of the work platform 12 and determines the move direction of the work platform 12, in order to capture the next image of the workpiece 3, and the procedure returns to step S4.

If the scanned points are within the obtained image, in step S10, the detecting unit 24 detects whether all the scanned points collectively form the closed edge path.

If the scanned points form the open edge path, the procedure returns to step S9; otherwise, if all the scanned points collectively form the closed edge path, in step S11, the user uses the storing unit 29 to store the coordinates of all the scanned points in the file.

Figure 9:
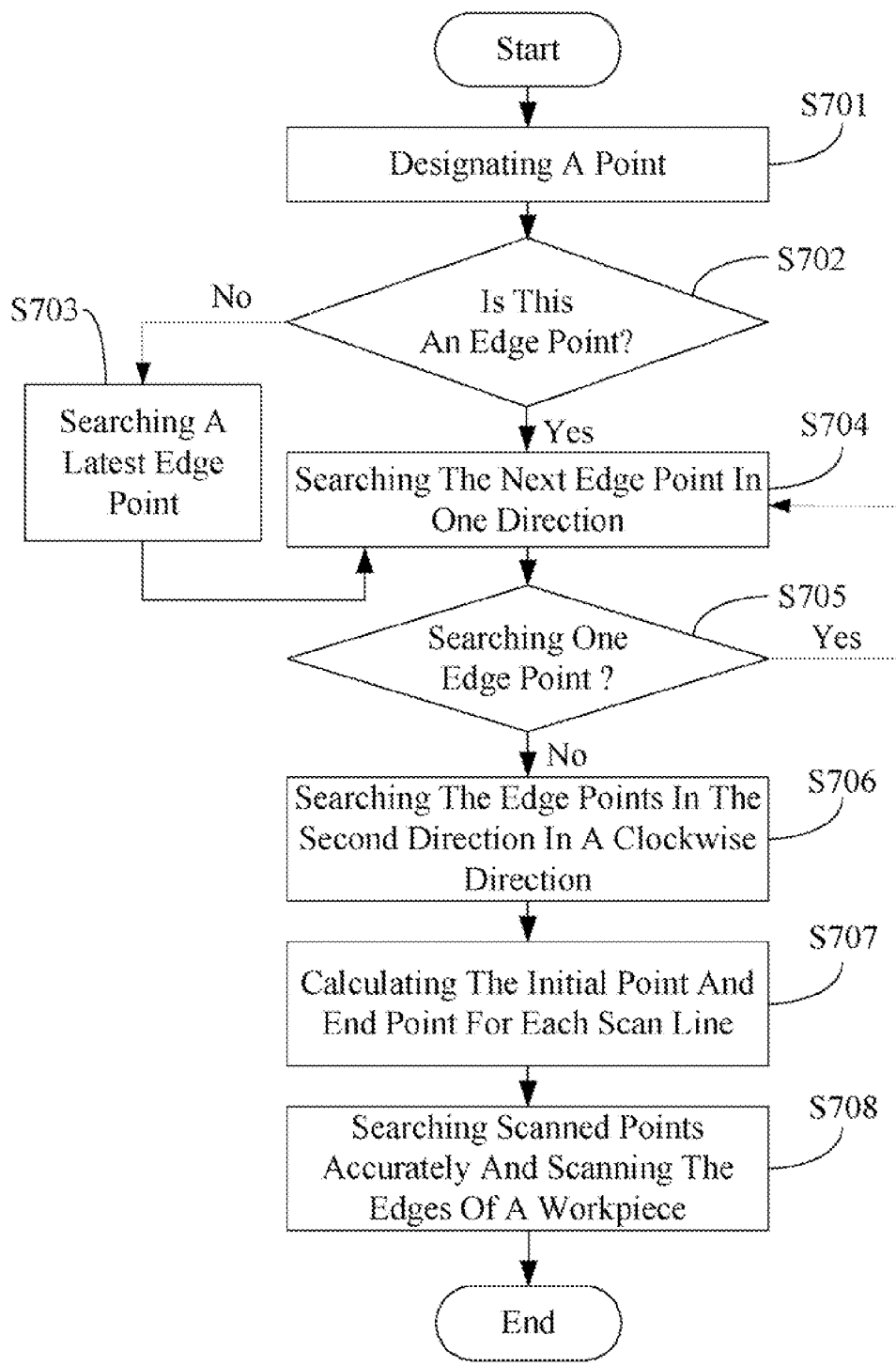
FIG. 9 is one step of FIG. 7 in detail, namely scanning the edges of the workpiece.

FIG. 9 is a flowchart of step S7 of FIG. 8 in detail, namely scanning the edges of the workpiece 3. In step S701, the user designates the point in the processed image.

In step S702, the detecting unit 24 detects whether the designated point is the first edge point. That is, the detecting unit 24 detects whether there is at least one point adjacent to the designated point, whose color is different with the designated point.

If the point is not the first edge point, in step S703, the extracting unit 26 searches the first edge point near the designated point in the clockwise direction, and the procedure directly goes to step S704.

If the point is the first edge point, in step S704, the edge extracting unit 26 searches the next edge point in one direction of the clockwise direction, for example, the edge extracting unit 26 searches the next edge point at the right of the first edge point.

In step S705, the detecting unit 24 detects whether there is one edge point that has been found in the direction.

If there is one edge point that has been found, the procedure returns to step S704, and the edge extracting unit 26 continues to search the edge points in the direction; If there is no edge points that have been found, in step S706, the edge extracting unit 26 considers the last edge point that has been found in the direction as an original point, so as to search the edge points in the second direction of the clockwise direction.

For example, the edge extracting unit 26 can search edge points on the right of the first edge point point-to-point until that there are no edge points to be found; consider the last right edge point that has been found as the original point, in order to search edge points under the last right edge point until there are no edge points to be found; search edge points at the left of the last found edge point until that there are no edge points to be found; and search edge points above the last left edge point until that there are no edge points to be found.

In step S707, the edge extracting unit 26 extracts the outline of the processed image according to all the searched edge point, the scan line calculating module 270 calculates the normal vectors for each edge point, and calculates the initial point and the end point of each of the scan line on the outline according to the scan line length and the corresponding normal vector.

In step S708, the edge scan module 272 searches all the initial points and end points in the obtained image (see in FIG. 3), connects the initial points with the corresponding end points, and searches the scanned points accurately, and the edge scan module 272 executes the edge scan according to the scanned points.

Alternatively, in the preferred embodiment, the edge extracting unit 26 can also search the edge points along the counter-clockwise direction.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for scanning edges of a workpiece, the system comprising an image measuring machine and a computer, the image measuring machine comprising a charge coupled device (CCD), a work platform configured with the workpiece ready to be scanned, and three motors, the computer comprising:
a parameter setting unit configured for setting parameters of scanning edges of the workpiece;
a motion control adapter card connected with the motors, and configured for controlling movements of the motors to locate the work platform and focus the CCD on the workpiece;
an image adapter card connected with the CCD, and configured for collecting at least one image of the workpiece captured by the CCD;
an image obtaining unit configured for obtaining an image from the image adapter card if the CCD captures the workpiece;
an image processing unit configured for executing an image sharpness process and an image binarization process in order that the background color of the image is opposite to the color of the workpiece on the image;
an edge extracting unit configured for searching a first edge point near a designated point in the image in a clockwise direction, wherein there is at least one point adjacent to the first edge point whose color is different with the color of the first edge point, and configured for searching other edge points of the image along with the manner of searching the first edge point by utilizing a recursive method, and extracting an outline of the image based on the searched edge points;
an image edge scan unit configured for calculating normal vectors and tangent vectors for each edge point on the outline, calculating coordinates of initial points and end points of scan lines according to the corresponding normal vectors and the parameters, and searching scanned points on the image that has not been processed accurately according to the initial points and the end points, and scanning the edges of the workpiece based on the scanned points;
a detecting unit configured for detecting whether each of the scanned points is within the image, and detecting whether all the scanned points collectively form a closed edge path of the workpiece; and
a calculating unit configured for calculating a move distance of the work platform and determining the move direction of the work platform according to the tangent vectors, in order to capture a next image of the workpiece if any scanned point is not within the image or if all the scanned points collectively form an open edge path.

2. The system according to claim 1, further comprising a storing unit configured for storing coordinates of all the scanned points in the computer.

3. The system according to claim 1, wherein the three motors comprise an x-axis motor, a y-axis motor, and a z-axis motor, the x-axis motor and the y-axis motor being configured for controlling the movements of the work platform, the z-axis motor being configured for controlling up-and-down movements of the CCD.

4. The system according to claim 1, wherein the setting parameters comprise a scan line length, a scan line width, a dividing value of an image binarization, and a draw line parameter for determining whether to draw scan lines.

5. The system according to claim 4, wherein the image edge scan unit comprises: a scan line calculation module configured for calculating normal vectors and tangent vectors for each edge point, calculating initial points and end points for scan lines according to the corresponding normal vectors and the scan line length, and determining a position and direction of the next edge point according to the corresponding tangent vector; and an edge scan module configured for searching scanned points on the mage accurately according to the initial points and end points.

6. A method for scanning edges of a workpiece which is configured in a computer being connected with an image measuring machine, the image measuring machine comprising a charge coupled device (CCD), a work platform configured with the workpiece ready to be scanned, and three motors, the method comprising:
(a) setting parameters for scanning edges of the workpiece;
(b) focusing the CCD on the workpiece, and obtaining an image of the workpiece captured by the CCD that is ready to be scanned;
(c) executing an image sharpness process and an image binarization process in order that the background color of the image is opposite to the color of the workpiece on the image, and designating a point in the image;

(d) searching a first edge point near the designated point in a clockwise direction, wherein there is at least one point adjacent to the first edge point whose color is different with the color of the first edge point;

(e) searching other edge points in the manner of searching the first edge point by utilizing a recursive method;

(f) extracting an outline of the image based on the searched edge points;

(g) calculating normal vectors and tangent vectors for each of the edge points on the outline, calculating coordinates of initial points and end points of scan lines according to the corresponding normal vectors and the parameters, and searching scanned points according to the initial points and end points on the image that has not been processed;

(h) scanning edges of the workpiece based on the scanned points;

(i) detecting whether the scanned points are within the image;

(j) calculating a move distance of the work platform and determining the move direction of the work platform according to the tangent vectors to capture a next image of the workpiece if any scanned point is not within the image, and controlling the motors to move the work platform;

(k) detecting whether all the scanned points collectively form a closed edge path of the image if the scanned points are within the image; and (l) returning to the step (j) if the scanned points collectively form an open edge path.

7. The method according to claim 6, further comprising: storing coordinates of all the scanned points in the computer.

8. The method according to claim 6, wherein the step of searching the other edge points by utilizing the recursive method comprises:

searching the edge points in one direction; detecting whether there is one edge point that has been found in the direction;

continuing to search the edge points in the direction if there is one edge point that has been found; and considering the last edge point that has been found in the direction as an original point to search the edge points in the second direction of the clockwise direction.

9. The method according to claim 6, wherein the parameters comprise a scan line length, a scan line width, a dividing value of an image binarization, and a draw line parameter for determining whether to draw scan lines.

10. The method according to claim 9, wherein the step (g) further comprises the step: determining a position and direction of the next edge point according to the corresponding tangent vector.

11. A method for scanning edges of a workpiece which is configured in a computer being connected with an image measuring machine, the image measuring machine comprising a charge coupled device (CCD), a work platform configured with the workpiece ready to be scanned, and three motors, the method comprising:

(a) setting parameters for scanning edges of the workpiece;

(b) focusing the CCD on the workpiece, and obtaining an image of the workpiece captured by the CCD that is ready to be scanned;

(c) executing an image sharpness process and an image binarization process in order that the background color of the image is opposite to the color of the workpiece on the image, designating a point in the image;

(d) searching a first edge point near the designated point in a counter-clockwise direction, wherein there is at least one point adjacent to the first edge point whose color is different with the color of the first edge point;

(e) searching other edge points in the manner of searching the first edge point by utilizing a recursive method;

(f) extracting an outline of the image based on the searched edge points;

(g) calculating normal vectors and tangent vectors for each of the edge points on the outline, calculating coordinates of initial points and end points of scan lines according to the corresponding normal vectors and the parameters, and searching scanned points according to the initial points and end points on the image that has not been processed;

(h) scanning edges of the workpiece based on the scanned points;

(i) detecting whether the scanned points are within the image;

(j) calculating a move distance of the work platform and determining the move direction of the work platform according to the tangent vectors to capture a next image of the workpiece if any scanned point is not within the image, and controlling the motors to move the work platform;

(k) detecting whether all the scanned points collectively form a closed edge path of the image if the scanned points are within the image; and (l) returning to the step (j) if the scanned points collectively form an open edge path.

* * * * *